(12) United States Patent
Herbst

(10) Patent No.: US 6,241,861 B1
(45) Date of Patent: Jun. 5, 2001

(54) WASTE WATER TREATMENT TANK USING AN ELECTROCHEMICAL TREATMENT PROCESS

(76) Inventor: Robert Herbst, 3201 S. Zuni St., Unit B, Englewood, CO (US) 80110

( * ) Notice: Subject to any disclaimer, the term of this patent is extended or adjusted under 35 U.S.C. 154(b) by 0 days.

(21) Appl. No.: 09/329,268

(22) Filed: Jun. 28, 1999

Related U.S. Application Data

(63) Continuation-in-part of application No. 09/209,852, filed on Dec. 11, 1998, now abandoned.
(51) Int. Cl.[7] .............................. C25B 15/00; C25B 9/00
(52) U.S. Cl. ........................ 204/229.6; 204/240; 204/269; 204/270
(58) Field of Search ..................................... 204/269, 270, 204/229.6, 230.2, 240

(56) References Cited

U.S. PATENT DOCUMENTS

| | | | |
|---|---|---|---|
| 4,149,953 | * | 4/1979 | Rojo ...................................... 204/269 |
| 4,919,775 | * | 4/1990 | Ishigaki ............................. 204/269 X |
| 5,049,252 | * | 9/1991 | Murrell ............................. 204/269 X |
| 5,324,396 | * | 6/1994 | Ferron et al. ..................... 204/269 X |
| 5,531,865 | * | 7/1996 | Cole ................................. 204/237 X |
| 5,549,812 | * | 8/1996 | Witt ................................. 204/269 X |

* cited by examiner

*Primary Examiner*—Donald R. Valentine
(74) *Attorney, Agent, or Firm*—Edwin H. Crabtree; Ramon L. Pizarro; Donald W. Margolis

(57) ABSTRACT

A water treatment tank for treating waste water using an electrochemical treatment process. The electrochemical process removes both suspended and dissolved solids and allows the treated water to be decanted from the treatment for reuse or discharge. The tank includes a tank housing with a first and second waste water receiving compartments. A waste water inlet line is attached to the top of the first compartment for filling the compartment with waste water. A side of the first compartment includes an opening for receiving an electrode assembly with a plurality of electrodes extending inside the compartment. The electrodes are attached to the power supply via electrode cables with the polarity of a current cycle reversed periodically depending on the types of water contaminates being treated. A filtrate sump is mounted in the bottom of the tank housing.

11 Claims, 1 Drawing Sheet

US 6,241,861 B1

WASTE WATER TREATMENT TANK USING AN ELECTROCHEMICAL TREATMENT PROCESS

This application is a continuation-in-part application of a patent application Ser. No. 09/209,852 filed on Dec. 11, 1998, now abandoned, by the subject inventor and having a title of "INSITU ELECTROCHEMICAL WATER TREATMENT PROCESS FOR PITS AND LAGOONS".

BACKGROUND OF THE INVENTION

1. Field of the Invention

This invention relates to a water treatment tank and process for treating contaminated waste water and more particularly, but not by way of limitation, to a tank and process using an electrochemical treatment of the water for dropping out and stratifying various types of contaminates held in suspension.

2. Discussion of Prior Art

In U.S. Pat. Nos. 4,293,400 and 4,378,276 to Liggett, an apparatus with a positively charged aluminum electrode and a negatively charged tubular steel electrode are disclosed for the electrolytic treatment of water. In U.S. Pat. No. 5,587,057 to Metzler et al., an electrocoagulation process is described having electrolytic treaters for treating a highly conductive liquid media.

In U.S. Pat. No. 4,872,959 to Herbst et al., U.S. Pat. Nos. 5,043,050 and 5,423,962 to Herbst, the inventor of the subject invention, Robert J. Herbst describes different types of improved electrolytic systems for treating aqueous solutions using conductive conduits and precipitating various organic and inorganic materials suspended in the solution.

None of the above mentioned prior art electrolytic treatment systems of liquids disclose the subject water treatment tank for treating waste water or teach the electrochemical process used with the tank as disclosed herein.

SUMMARY OF THE INVENTION

In view of the foregoing, it is a primary object of the invention to treat contaminated water and waste water for separating various types of contaminates from the water in a water treatment tank. The tank may include one or more water treatment compartments and made in various sizes and shapes for treating small and large volumes of waste water. The water treatment tank may be lightweight and portable or made into a stationary installation.

Another object of the subject process is to treat the contaminated water using an electrochemical process wherein suspended and dissolved solids in the water are removed and the treated clean water is decanted from the tank for reuse or discharge.

Still another object of the invention is the contaminates are allowed to stratify in the tank with sludge settling to a bottom of the tank and lighter than water contaminates floating on top of the treated water. The sludge is removed from the bottom of the tank and filtered in filter baskets. The contaminates floating on top of the treated water and removed by a vacuum pump and also filtered in the filter baskets.

The water treatment tank includes a tank housing with a first and a second waste water receiving compartment. The two compartments are identical in structure and function and are used alternately when treating large volumes of waste water. A waste water inlet line is attached to the top of the first compartment for filling the compartment with waste water. A side of the first compartment includes an opening for receiving an electrode assembly with a plurality of electrodes extending inside the compartment for treating the waste water electrochemically. The electrodes are attached to the power supply via electrode cables with the polarity of a current cycle reversed periodically depending on the types of water contaminates being treated. When the cycle is reversed, the contaminants gathered on the electrodes typically fall to the bottom of the tank as sludge and are drained into a removable filter basket. The basket is slidably received below the bottom of the tank for removing the sludge. The tank also includes a vacuum pump with vacuum line for removing the contaminates floating on top of the treated water and discharging the contaminates into the filter basket.

These and other objects of the present invention will become apparent to those familiar with the electrochemical or electrocoagulation treatment of contaminated water when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
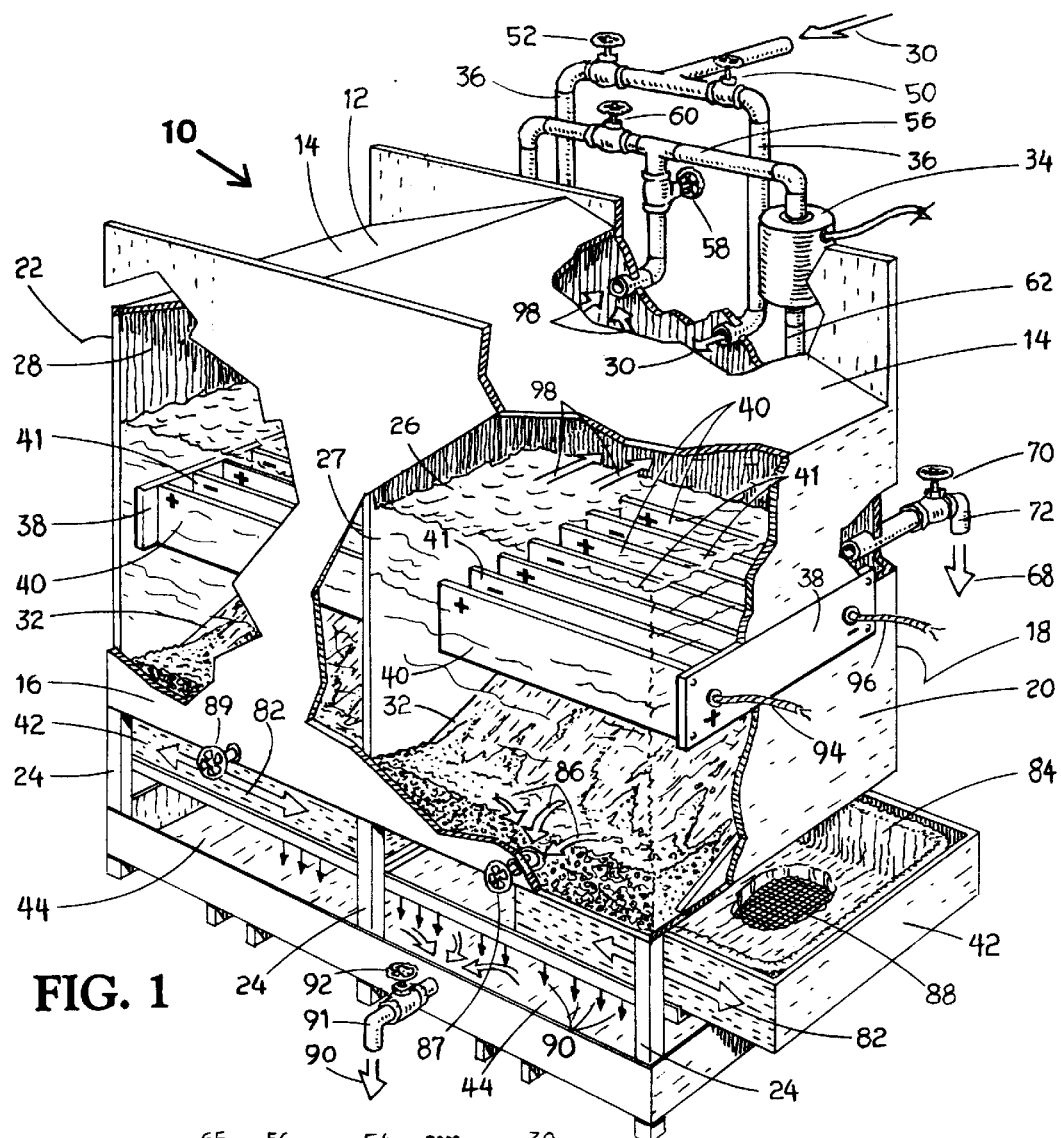
FIG. 1 is a perspective view of a water treatment tank with separate waste water receiving tanks used for treating waste water received from a waste water collection tank or the like. A portion of the waste water receiving tanks has been cut-away to expose an electrode assembly with positive and negative electrodes received inside the compartments.

In FIG. 1, a perspective view of the subject water treatment tank is illustrated and having general reference numeral 10. The tank 10 includes a tank housing 12 with sloping roof 14, a front 16, a rear 18, a first side 20 and a second side 22, and a housing frame 24. The tank housing 12 is divided into a first waste water receiving compartment 26 and a second waste water receiving compartment 28. The two compartments 26 and 28 are identical in size and shape and are used alternately when treating the waste water. For example, while the first compartment 26 is treating waste water, the second compartment 28 can be in the process of being filled with waste water. It should be noted that the tank 10 may hold 55 gallons of waste water, 500 gallons, 1000 gallons and more depending on the amount of waste water generated during a daily operation and required to be cleaned for reuse or discharge.

The first compartment 26, shown in FIG. 1, has been cut-away to illustrate waste water, shown as arrows 30 coming into the compartment 26 and being treated, with the treated water being stratified inside the first compartment 26 prior to removal. Also, a portion of the second compartment 28 has been cut-away. There is no waste water 30 shown in the second compartment 28. Both the first and second compartments 26 and 28 include a sloping bottom 32 which slopes downwardly from the rear 18 to the front 20 of the tank housing 12. The compartments 26 and 28 are divided by a common wall 27.

The tank 10 also includes a vacuum pump 34 connected to the compartments 26 and 28, a waste water inlet line 36, a pair of electrode assemblies 38 with positive and negative electrodes 40 and 41, a pair of sliding filter baskets 42 received under the compartment 26 and 28 and a filtrate sump 44 attached to the housing frame 24 and disposed below the filter baskets 42.

Figure 2:
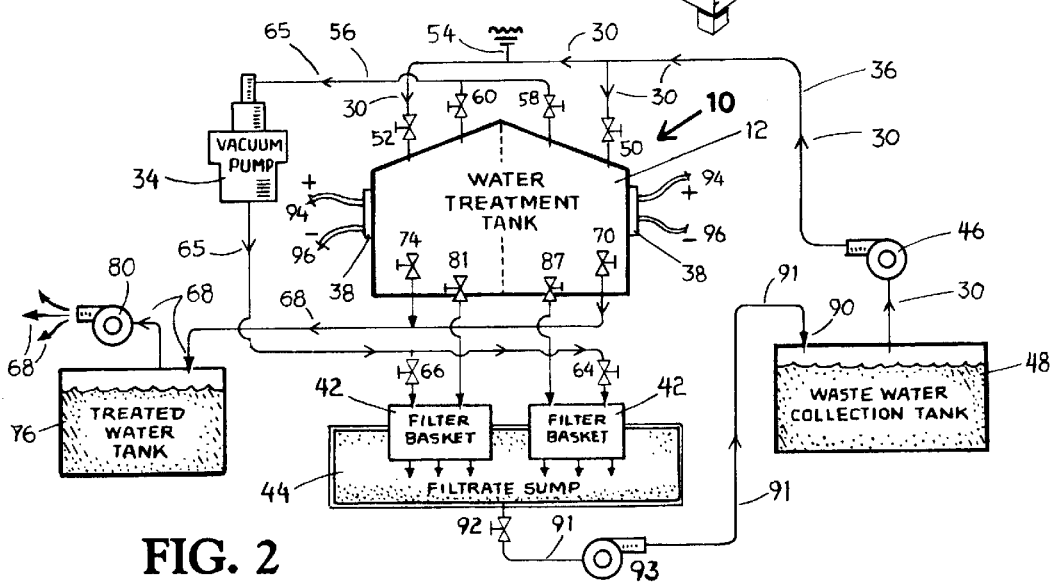
FIG. 2 is a flow diagram illustrating the water treatment tank with vacuum pump, filter baskets and filtrate sump connected to a waste water collection tank and a treated water tank.

Referring now to the tank 10 shown in FIG. 1 and the flow diagram shown in FIG. 2, the waste water inlet line 36 is shown connected to a waste water pump 46. The waste water pump 46 is connected to a waste water collection tank 48 which is used for holding waste water to be treated. While the waste water collection tank 48 is shown, it can be appreciated that a water pit, lagoon, pond, sump and any other water gathering source can be used equally well for holding contaminated water to be treated by the water treatment tank 10. The inlet line 36 includes a first water inlet valve 50 and a second water inlet valve 52 and a siphon vent 54. Obviously, by opening the first inlet valve 50 and closing the second inlet valve 52, the first compartment 26 can be filled. In turn, by opening the second inlet valve 52 and closing the first inlet valve 50, the second compartment 28 can be filled with waste water 30. Both of the compartments 26 and 28 include a level switch in the top of the compartments for automatically closing the valves 50 and 52 when the compartments are filled with waste water and the waste water is ready for treatment. The level switches are not shown in the drawings.

The vacuum pump 34 is connected to the top of the compartments 26 and 26 via a vacuum inlet line 56. The vacuum inlet line 56 is connected to a first vacuum inlet valve 58 which when opened draws a vacuum inside the first compartment 26. The vacuum inlet line 56 is also connected to a second vacuum inlet valve 60 which when opened draws a vacuum inside the second compartment 28. From the vacuum pump 34, a vacuum outlet line 62 is connected to the rear 18 of the tank housing 12 and disposed above the filter baskets 42 for discharging lighter than water contaminates floating on top of the treated water in the compartments 26 and 28. The vacuum outlet line 62 is connected to a first vacuum outlet valve 64 which when opened discharges the vacuumed contaminates, shown as arrows 65, from the first compartment 26 into a first filter basket 42. Also, the vacuum outlet line 62 is connected to a second vacuum outlet valve 66 which when opened discharges the vacuumed contaminates 65 from the second compartment 28 into a second filter basket 42. The vacuum outlet valves 64 and 66 are shown in FIG. 2, but not shown in FIG. 1.

In FIG. 1, treated water shown as arrow 68 is removed from the rear 18 of the tank housing 12 via a first treated water valve 70 connected to the first compartment 26 and out a treated water outlet line 72. The treated water outlet line 72 is also connected to a second treated water valve 74. The second treated water valve 74 is connected to the rear of the second compartment 28. The second treated water valve 74 is not shown in FIG. 1, but can be seen in FIG. 2. The treated water outlet line 72 discharges the treated water into a treated water tank 76 shown in FIG. 2. The treated water 68 can be reused for spray applications, irrigation, etc. using a discharge line 78 and spray pump 80. Also, the treated water 68 can be discharged or reused for a variety of commercial applications.

Referring again to both FIGS. 1 and 2, the two filter baskets 42 are slidably received, as indicated by arrows 82, under the bottom of the first and second compartments 26 and 28. The filter basket 42 on the right is shown partially received under the first compartment 26. The filter baskets 42 each include a filter liner 84 which is used for dewatering sludge 86 which is collected in the bottom of the first and second compartments. The bottom of the filter baskets 42 include a wire mesh screen 88 which is used to allow the filtered water, indicated by arrows 90, to fall from the filter liner 84 and through the screen 88 into the filtrate sump 44.

The filtered water 90 is discharged out the filtrate sump 44 using a filtrate sump valve 92 connected to a filtered water discharge line 91 and a discharge pump 93. The discharge line 91 is connected to the waste water collection tank 48 where the filtered water 90 is received using the pump 93 and recycled back to the tank 10 for further treating.

In FIG. 1, the waste water 30 in the first compartment 26 is shown being treated electrochemically using the electrode assembly 38. As mentioned above, the electrode assembly 38 includes a plurality of positive electrodes connected to a positive electrode cable 94 which is connected to an outside power source. The outside power source is not shown in the drawings. Also, the plurality of negative electrodes 41, received equally spaced and between the positive electrodes 40, are connected to a negative electrode cable 96 connected to the outside power source.

It should be noted that the preferred power source is direct current, however, other forms of electricity might be employed. The polarity reversing cycle will be dependent on the type of waste water and the contaminates being treated. The longer the cycle without plugging the electrodes 40 and 41 the better, but reality dictates shorter cycles of 1 to 5 minutes or less to prevent the plating of contaminates on the electrodes 40 and 41.

Also, it should be mentioned, the electrical current between the electrodes 40 and 41 causes a myriad of electrochemical phenomena to occur. For example, colloidal particles are flooded with electrons that cause them to become more dense and electronegative. A positive metallic ion that is sacrificed from the electrodes, becomes an attractive nucleus to the electronegative colloidal particles. This forms a dense precipitate, which then tends to settle to the bottom of the tank compartments. Also, many other electrochemical phenomena can occur due to the general complex components and contaminates found in waste water.

As the electrical cycle is reversed, the plate scale is expelled from the electrodes and typically the heavy contaminates, in the form of sludge 86, fall to the bottom of the compartment 26 as shown in FIG. 1. The sludge 86 is discharged into the filter baskets 42 using a first sludge discharge valve 87 in the bottom of the first compartment 26 and a second sludge discharge valve 89 in the bottom of the second compartment 28. Note, the sloping bottom 32 of the compartments 26 and 28 aid in feeding the stratified sludge 86 downwardly by gravity prior to the sludge exiting out the sludge discharge valves 87 and 89 and into the filter baskets 42.

Some contaminates in the water treatment process are of less specific gravity than the water being treated and will tend to float to the top surface, as indicated by arrows 98. The lighter than water contaminates 98 are drawn out of the compartment 26 using the vacuum pump 34 and discharged into the filter basket 42. The contaminates 98 are then dewatered using the filter liner 84.

In Operation

In operation, the first compartment 26 of the tank 10 is filled with waste water 30 by opening the first inlet valve 50. The waste water pump 46 is then turned "on" and the waste water 30, which has been collected in the waste water collection tank 48, is pumped into the compartment 26. Using a waste water level switch inside the first compartment 26, the pump 46 is turned "off" when the compartment is filled with waste water 30. At this time, the outside power supply is turned "on" to the electrode cables 94 and 96 and electrical power is supplied to the electrodes 40 and 41 for treating the waste water 30 electrochemically. Depending on the type and amount of contaminates in the waste water, the water will be treated for 30 minutes to an hour or longer.

The power supply is then turned "off" and the treated water is allowed to stratify as shown in FIG. 1. The lighter than water contaminates 98 may be vacuumed off during the water treating operation and after the electrical power is shut down. As mentioned above, while the waste water 30 is being treated in the first compartment 26, at the same time the second compartment 28 can be filled with waste water in preparation for water treatment.

When the water has stratified in the first compartment 26, the treated water 68 is decanted out the first compartment by opening the first treated water valve 70. The treated water 68 is discharged into the treated water tank 76 where the water can be reused or discharged. After the treated water 68 is removed, the first sludge discharge valve 87 is opened and the heavy contaminates in the form of sludge 86 are allowed to drain into the filter basket 42. The sludge 86 and the lighter than water contaminates 98 are dewatered using the filter liner 84. The filtered water 90 is allowed drain into the filtrate sump 44. When the filtrate sump 44 is filled, the filtrate sump valve 92 is opened and the filter water 90 is pumped back to the waste water collection tank using the discharge line 91 and discharge pump 93.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A water treatment tank for treating waste water using an electrochemical treatment process, the electrochemical process removes both suspended and dissolved solids in the waste water and allows treated water to be removed from the tank, heavy contaminates settle to the bottom of the tank as sludge and are removed while lighter than water contaminates are removed by vacuum from the top of the tank, the tank comprising:
   a tank housing, said tank housing including a first waste water receiving compartment, said compartment having sides, a rear, a front, a top and a bottom;
   a waste water inlet line with waste water inlet valve, said inlet line attached to said first compartment for filling said first compartment with waste water;
   a treated water outlet line with treated water valve, said outlet line attached to said first compartment for removing treated water therefrom;
   an electrode assembly mounted in the side of said compartment, said electrode assembly having a plurality of positive and negative electrodes attached thereto, said electrodes extending inside said first compartment for treating the waste water electrochemically, said positive and negative electrodes attached to electrode cables for receiving direct current, said cables adapted for attachment to a direct current power supply, a polarity of a direct current cycle to said cables being reversed periodically depending on the types of waste water contaminates being treated;
   a removable filter basket disposed below the bottom of said first compartment, the bottom of said first compartment having a first sludge discharge valve therein for draining sludge into said filter basket;
   a filtrate sump mounted in a bottom of said tank housing, said filtrate sump disposed below said filter basket and adapted for receiving water from said filter basket; and
   a vacuum pump with vacuum inlet line with vacuum inlet valve, said vacuum inlet line connected to the rear of said first compartment, said vacuum pump adapted for drawing a vacuum inside said first compartment and removing lighter than water contaminates therefrom and discharging the lighter than water into said filter basket.

2. A water treatment tank for treating waste water using an electrochemical treatment process, the electrochemical process removes both suspended and dissolved solids and contaminates in the waste water and allows treated water to be removed from the tank, heavy contaminates settle to the bottom of the tank as sludge and are removed while lighter than water contaminates are removed by vacuum from the top of the tank, the tank comprising:
   a tank housing, said tank housing including a first waste water receiving compartment, said first compartment having sides, a top and a bottom, said first compartment adapted for receiving waste water to be treated therein;
   a vacuum pump with vacuum inlet line connected to said first compartment, said vacuum pump adapted for drawing a vacuum inside said first compartment and removing lighter than water contaminates therefrom;
   means for removing treated water from said first compartment and attached thereto;
   an electrode assembly mounted on said first compartment, said electrode assembly having a plurality of positive and negative electrodes attached thereto, said electrodes extending inside said first compartment for treating the waste water electrochemically when electrical power is applied to said electrodes; and
   means for collecting sludge received in the bottom of said first compartment, said means for collecting sludge disposed below the bottom of said first compartment.

3. The tank as described in claim 2 wherein said positive and negative electrodes are attached to electrode cables for receiving direct current, said electrode cables adapted for attachment to a direct current power supply, a polarity of a direct current cycle to said cables being reversed periodically depending on the types of waste water contaminates being treated.

4. The tank as described in claim 2 wherein said means for collecting sludge is a filter basket.

5. The tank as described in claim 4 further including a filtrate sump mounted in a bottom of said tank housing, said filtrate sump disposed below said filter basket and adapted for receiving water from said filter basket.

6. The tank as described in claim 2 wherein said means for removing treated water is a treated water outlet line attached to said first compartment, said treated water outlet line connected to a treated water valve for opening and closing said outlet line.

7. The tank as described in claim 2 wherein said vacuum inlet line includes a vacuum inlet valve for opening when drawing a vacuum inside said first compartment.

8. A water treatment tank for treating waste water using an electrochemical treatment process, the electrochemical process removes both suspended and dissolved solids in the waste water and allows treated water to be removed from the tank, heavy contaminates settle to the bottom of the tank as sludge and are removed while lighter than water contaminates are removed by vacuum from the top of the tank, the tank comprising:

- a tank housing, said tank housing including a first waste water receiving compartment, said compartment having sides, a rear, a front, a top and a bottom;
- a waste water inlet line attached to said first compartment for filling said first compartment with waste water;
- a treated water outlet line attached to said first compartment for removing treated water therefrom;
- an electrode assembly mounted in the side of said compartment, said electrode assembly having a plurality of positive and negative electrodes attached thereto, said electrodes extending inside said first compartment for treating the waste water electrochemically, said positive and negative electrodes are attached to electrode cables for receiving direct current, said cables adapted for attachment to a direct current power supply, a polarity of a direct current cycle to said cables being reversed periodically depending on the types of waste water contaminates being treated; and
- a removable filter basket disposed below the bottom of said first compartment, the bottom of said first compartment having a first sludge discharge valve therein for draining sludge into said filter basket.

9. The tank as described in claim 8 further including a filtrate sump mounted in a bottom of said tank housing, said filtrate sump disposed below said filter basket and adapted for receiving water from said filter basket.

10. The tank as described in claim 8 further including a vacuum pump with vacuum inlet line connected to the rear of said first compartment, said vacuum pump adapted for drawing a vacuum inside said first compartment and removing lighter than water contaminates therefrom.

11. The tank as described in claim 8 wherein said vacuum inlet line includes a vacuum inlet valve for opening when drawing a vacuum inside said first compartment.

\* \* \* \* \*